W. R. STRICKLAND.
COMBINED SPRING HORN AND BUMPER SUPPORT.
APPLICATION FILED FEB. 10, 1921.
1,421,608.
Patented July 4, 1922.
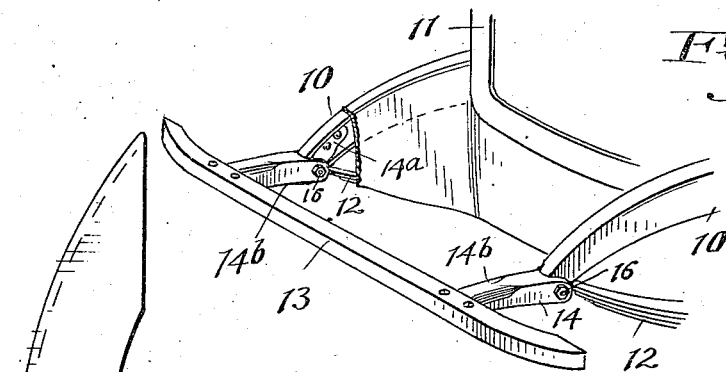
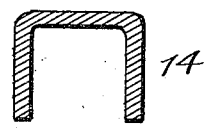
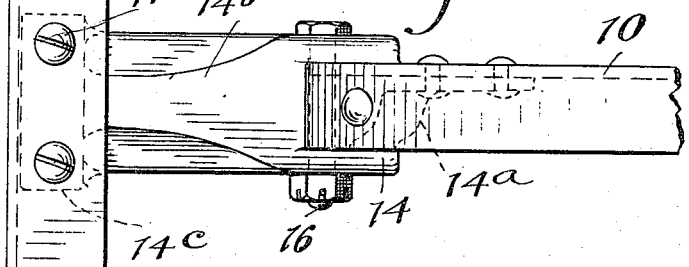
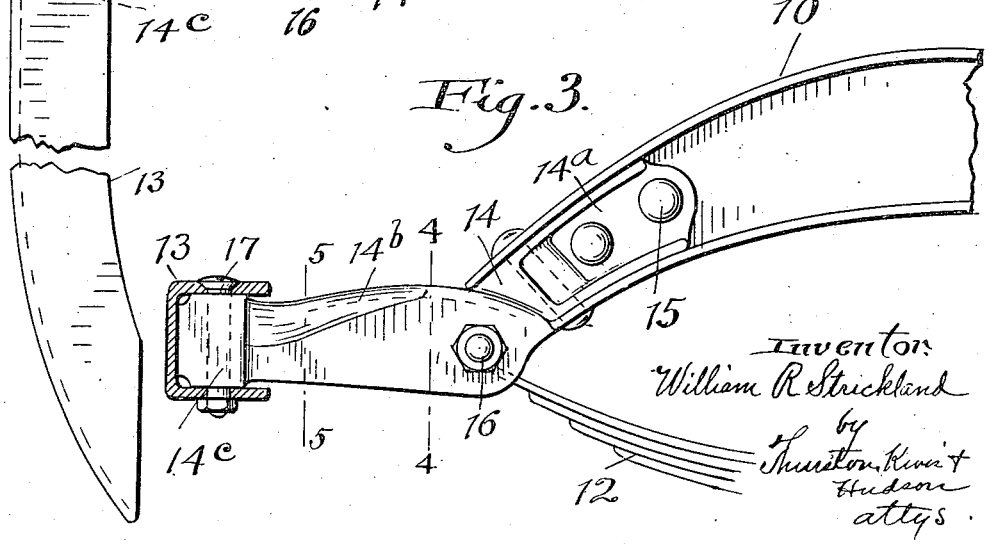

UNITED STATES PATENT OFFICE.

WILLIAM R. STRICKLAND, OF EAST CLEVELAND, OHIO, ASSIGNOR TO THE PEERLESS MOTOR CAR COMPANY, OF CLEVELAND, OHIO, A CORPORATION OF OHIO.

COMBINED SPRING HORN AND BUMPER SUPPORT.

1,421,608.    Specification of Letters Patent.    Patented July 4, 1922.

Application filed February 10, 1921. Serial No. 443,812.

*To all whom it may concern:*

Be it known that I, WILLIAM R. STRICKLAND, a citizen of the United States, residing at East Cleveland, in the county of Cuyahoga and State of Ohio, have invented a certain new and useful Improvement in Combined Spring Horn and Bumper Supports, of which the following is a full, clear, and exact description.

This invention relates to a combined spring horn and bumper support, and has for one of its objects to reduce the parts heretofore utilized in connecting the front springs to the front ends of the chassis frame of an automobile, and in supporting the bumper.

Further the invention aims to provide an improved bumper support preferably formed in one integral piece with the spring horn and connected to the bumper in a manner such that the transverse swinging or turning of one side channel of the chassis frame relative to the other, and also, vertical reciprocating movements of one side channel with reference to the other are minimized.

Briefly, therefore, it is the aim of the invention to provide a simplified construction, also a rigid unitary spring horn and bumper support, and to connect the forwardly projecting arms thereof to the bumper in a manner such as to increase the rigidity of the frame and reduce relative movement between the side members thereof.

The above objects are attained in a very effective manner by my invention which may be briefly summarized as consisting in certain novel details of construction, and combinations and arrangements of parts which will be described in the specification and set forth in the appended claims.

In the accompanying sheet of drawings wherein I have shown the preferred embodiment of my invention which operates with high efficiency, Fig. 1 is a perspective view of the front of an automobile equipped with my invention; Fig. 2 is a top plan view showing a portion of the bumper, one of the bumper supports and the forward end of one of the channels or side members of the chassis frame; Fig. 3 is a side view of the same with the bumper in section; and Figs. 4 and 5 are transverse sectional views through the bumper supports substantially along the lines 4—4 and 5—5 of Fig. 3.

Referring now to the drawings, 10 represents the side members of the chassis frame of an automobile, 11 the radiator, 12 the front springs, and 13 the front bumper.

Ordinarily each spring 12 it attached to the forward end of the corresponding chassis frame member 10, by a spring bolt passing through the eye of a member called a spring horn, bolted or riveted in the frame member 10 which is generally a channel, and usually the bumper is connected to bumper supporting arms generally yieldingly or slidingly connected to the front spring horns, or direct to the front ends of the chassis frame members.

In accordance with the present invention, one rigid piece 14 is utilized as a combined spring horn and bumper supporting arm. This piece 14 has a portion $14^a$ which fits into the forward end of the channel or chassis frame member 10, and is secured therein by rivets 15. Likewise, the member 14 has an arm $14^b$ which is integral with the part $14^a$ and projects horizontally from the forward end of the chassis frame member 10 at an angle to the part $14^a$. The arm $14^b$ is somewhat wider than the part $14^a$, and, in fact, somewhat wider than the front end of the channel 10 as viewed from the top, and it is channel shaped in cross-section, the channel facing downwardly as is apparent from Figs. 4 and 5.

At the junction of the parts $14^a$ and $14^b$ of the combined spring horn and bumper support, an opening is formed to accommodate a spring bolt 16 for attaching the forward end of the front spring 12 to the member 14. The extreme forward end $14^c$ of the arm $14^b$ is flattened and transversely extended so as to form a bearing of considerable length for the bumper 13.

This bumper 13 is channel shaped with the channel facing rearwardly, and the front end $14^c$ of each bumper supporting arm is fitted into the channel, and each is secured therein by a pair of bolts or equivalent means 17.

It will be noted, as already stated, that the part of the member 14 which is fitted into and secured in the channel of the chassis frame, and the part which projects forwardly therefrom to support the bumper constitute one rigid member, so that the bumper is rigidly supported instead of yieldingly supported as commonly done heretofore. It will be observed also, by reason of this rigid construction and by reason of the substantial bearing of the bumper on each bumper supporting arm 14ᵇ, and the manner in which the bumper is rigidly attached to the forward ends of the arms 14ᵇ, that the bumper not only performs its usual function as a bumper, but forms a stiffening member at the front of the frame, and in effect joining the extreme forward and lower ends of the channel members 10. Therefore, this member 13, connected and supported to the rigid bumper supporting arms as explained above, reduces very materially the transverse swinging of the forward ends of each chassis frame member 10 relative to the other about the longitudinal axis of the chassis frame member, and it likewise reduces very materially the up and down oscillation or reciprocation of one side frame member 10 with reference to the other. This function of the bumper 10 in the way of reducing the transverse swinging of the frame members and the relative up and down movement is attained only by reason of the rigidity of the construction, which is therefore an important characteristic of the invention along with the stiff or rigid and unitary or integral form of each combined spring horn and bumper support 14.

Having described my invention, I claim:

1. In an automobile having a chassis frame and front springs, a unitary combined spring horn and bumper support attached to the forward end of the chassis frame at each side, and having integral bumper supporting arms projecting forwardly from the frame, and a bumper attached to said arms.

2. In combination with an automobile having a chassis frame and front springs, unitary combined spring horns and bumper supports, each having a portion secured to the forward end of one side member of the chassis frame, and an arm integral with said portion and projecting forwardly at an angle thereto, and a bumper rigidly secured to the front ends of said arms.

3. In combination with an automobile having a chassis frame and front springs, unitary combined spring horns and bumper supports each having a portion secured to the forward end of a side member of the chassis frame and an arm integral with said portion and projecting forwardly at an angle thereto, and a bumper rigidly secured to the front ends of said arms, each spring being attached to the corresponding spring horn and bumper support at substantially the junction of the first-named portion thereof with the bumper supporting arm.

4. An automobile chassis having a pair of rigid bumper supporting arms projecting forwardly from the front ends of the side members of the frame thereof, said arms being provided at their forward ends with transversely extended bumper seats, and a bumper rigidly attached to said forward ends of the arms so as to reduce relative swinging or oscillating movements between the side members of the chassis frame.

5. An automobile chassis having a pair of rigid bumper supporting arms projecting forwardly from the front ends of the chassis frame and provided at their forward extremities with transversely extended bumper seats integral with the arms, and a channel shaped bumper receiving said seats and rigidly attached thereto.

6. An automobile chassis including a frame, unitary combined spring horns and bumper supports each having a portion secured to the forward end of a side member of the chassis frame and an arm integral with said portion and projecting forwardly at an angle thereto and provided at its forward extremity with an extended bumper seat, and a bumper receiving the seats of the two arms and rigidly attached thereto, whereby the bumper will perform its ordinary function and also constitutes a rigid bracing member for the chassis frame which reduces relative swinging or oscillating movements between the side members of the chassis frame.

In testimony whereof, I hereunto affix my signature.

WILLIAM R. STRICKLAND.